US009404424B2

(12) United States Patent
Morawski et al.

(10) Patent No.: US 9,404,424 B2
(45) Date of Patent: Aug. 2, 2016

(54) TURBINE CONDUIT PURGE SYSTEMS (71) Applicant: General Electric Company, Schenectady, NY (US)

(72) Inventors: Christopher John Morawski, Albany, NY (US); Joel Donnell Holt, Schenectady, NY (US); Richard John Rucigay, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 13/769,502

(22) Filed: Feb. 18, 2013

(65) Prior Publication Data
US 2014/0230402 A1  Aug. 21, 2014

(51) Int. Cl.
*F02C 1/00* (2006.01)
*F02C 7/232* (2006.01)
*F23K 5/18* (2006.01)

(52) U.S. Cl.
CPC ........... *F02C 7/232* (2013.01); *F05D 2260/602* (2013.01); *F23D 2209/30* (2013.01); *F23K 5/18* (2013.01)

(58) Field of Classification Search
CPC ............ F02C 7/232; F02C 7/22; F02C 7/222; F23D 2209/30; F23K 5/18; F05B 2260/602
USPC ...................................................... 60/39.094
See application file for complete search history.

(56) References Cited

U.S. PATENT DOCUMENTS

| 4,041,695 | A | * | 8/1977 | Harper et al. .................... 60/779 |
| 4,404,806 | A | * | 9/1983 | Bell et al. ......................... 60/737 |
| 4,984,424 | A | * | 1/1991 | Shekleton ................... 60/39.094 |
| 5,615,555 | A | | 4/1997 | Mina |
| 6,065,281 | A | | 5/2000 | Shekleton et al. |
| 6,145,294 | A | | 11/2000 | Traver et al. |
| 6,250,065 | B1 | | 6/2001 | Mandai et al. |
| 6,438,963 | B1 | | 8/2002 | Traver et al. |
| 7,730,711 | B2 | * | 6/2010 | Kunkle et al. ............... 60/39.094 |
| 2005/0193741 | A1 | * | 9/2005 | Iasillo et al. ..................... 60/776 |
| 2007/0101720 | A1 | * | 5/2007 | Kunkle et al. ................... 60/646 |
| 2009/0165435 | A1 | | 7/2009 | Koranek |

* cited by examiner

*Primary Examiner* — Gerald L Sung
(74) *Attorney, Agent, or Firm* — Fletcher Yoder, P.C.

(57) ABSTRACT

In one embodiment, a system is provided. The system includes a combustor configured to combust a fuel, and a three-way valve fluidly coupled the combustor and disposed upstream of the combustor. The system also includes a fuel circuit comprising a fuel supply, wherein the fuel circuit is disposed upstream of the three-way valve and is configured to provide the fuel to the three-way valve. The system additionally includes a fuel conduit section fluidly coupling the fuel circuit to the combustor. The system further includes an inert fluid supply configured to provide an inert fluid to the three-way valve and a compressor discharge (CPD) fluid source configured to provide a purge fluid to the three-way valve. The three-way valve is configured to purge the fuel from a first portion of the fuel conduit section by using the purge fluid.

22 Claims, 4 Drawing Sheets

TURBINE CONDUIT PURGE SYSTEMS

BACKGROUND OF THE INVENTION

The subject matter disclosed herein relates to systems and methods useful in purging or draining, and more specifically, to systems and methods suitable for purging conduits or pipes.

In some mechanical systems, such as turbine systems, conduits or piping may be used to deliver fluids. In certain circumstances, the fluids need to be drained prior to or after certain operations, such as startup operations and maintenance operations. Drain lines or conduits may be provided, for purging fluids from certain components. Unfortunately, drain lines may be susceptible to backflows, or unwanted changes in fluid flow direction.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a combustor configured to combust a fuel, and a switching circuit fluidly coupled the combustor and disposed upstream of the combustor. The system also includes a fuel circuit comprising a fuel supply, wherein the fuel circuit is disposed upstream of the switching circuit and is configured to provide the fuel to the switching circuit. The system additionally includes a fuel conduit section fluidly coupling the fuel circuit to the combustor. The system further includes an inert fluid supply configured to provide an inert fluid to the switching circuit and a compressor discharge (CPD) fluid source configured to provide a purge fluid to the switching circuit. The switching circuit is configured to purge the fuel from a first portion of the fuel conduit section by using the purge fluid, and wherein the first portion includes a length of at least 5 ft.

In a second embodiment, a turbine system includes a turbine having a combustor configured to combust a fuel and a multi-way valve having a first inlet, a second inlet, and an outlet, the outlet fluidly coupled the combustor. The turbine system further includes a compressor discharge (CPD) fluid source configured to provide a CPD purge fluid to the multi-way valve through a first circuit fluidly coupled to the first inlet and through a second circuit fluidly coupled to the second inlet. The multi-way valve is configured to switch between the first and the second inlets to purge the fuel from the turbine by using the CPD purge fluid.

In a third embodiment, a system includes a three-way valve having a first inlet, a second inlet, and an outlet. The outlet is configured to fluidly couple to a turbine system. The system further includes a fuel circuit fluidly coupled to the first inlet, wherein the fuel circuit is configured to provide a fuel to the turbine system. The system further includes a purge circuit fluidly coupled to the second inlet. The purge circuit is configured to purge the turbine system of the fuel, and wherein the three-way valve is configured to switch between the first and the second inlets to purge the fuel from the turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain mechanical systems, such as a turbine system, include multiple conduits or piping useful in the delivery of fluids. For example, turbine systems include certain conduits and valves useful in delivering liquid and gaseous fuel (e.g., syngas, kerosene, diesel, natural gas) into a combustor. The combustor may then ignite or combust the fuel, which may be used to rotatably move a plurality of blades disposed in a turbine engine, thus providing for mechanical power. The mechanical power may then be used, for example, by a generator suitable for converting mechanical motion into electric power.

Certain drain circuits described herein may be used to purge or drain liquid fuel from the combustor, up to an including fuel nozzles. For example, upon switchover of the turbine system from running on liquid fuel to running on gaseous fuel, fuel conduit lines leading to and including nozzles of the combustor may be substantially drained of leftover liquid fuel by using certain drain valves. The purge of liquid fuel may purge liquid fuel at a distance from the combustor nozzles (e.g., upstream from the combustor cover plate), such as approximately between 0 to 4 meters, 0 to 10 meters, 0 to 30 meters upstream from the combustor. That is, there would be substantially no liquid fuel left at approximately between 0 to 4 meters, 0 to 10 meters, 0 to 30 meters upstream from and including the combustor nozzles. Indeed, the turbine system may be substantially free of liquid fuel from the combustor nozzles up and including fuel lines outside of a turbine compartment.

When the turbine system is subsequently started on gaseous fuel, the drained circuits may be at ambient pressures. As the combustor ignites, combustor pressures may result in high fuel supply pressures. The drain circuits described herein may eliminate the possibility of combustor backflow by providing hydraulic circuitry suitable for draining the fluid fuel during a first mode of gaseous fuel operations and then filling the fluid fuel lines with a compressed fluid (e.g., air), for example, by using compressor discharge (CPD) air as a backstop fluid suitable for eliminating backflow through the fluid fuel lines. By adding compressed air (e.g., air compressed at over 14.7 PSI) into the empty fluid fuel lines, the techniques described herein may enhance turbine safety. Further, because the fuel lines may be empty of liquid fuel a considerable distance away from the turbine, the liquid fuel may not be exposed to temperatures that would have led to the formation of coke (e.g., solid carbonaceous material or particles). Accordingly, the liquid fuel lines may be kept substantially or entirely free of coke build-up.

In one embodiment, a three-way valve may be fluidly coupled to the compressor and used to eliminate a variety of check valves, solenoids, and the like, thus providing for a more efficient hydraulic circuitry suitable of purging or draining the fuel from the liquid fuel lines and for providing the compressed air. In other embodiments, the three-way valve may be replaced with a tee having two check valves, with a tee having two 2-way valves, with a multiport valve having 6 to 18 lines or more, or with other suitable components.

Further, the systems and methods described herein may be used for enabling a "purge credit" as per regulations (e.g., National Fire Protection Association purge credit regulations). For example, the "purge credit" may reduce the start time of a turbine system by eliminating the purging of the turbine and associated components (e.g., heat recovery steam generator [HRSG]) during turbine start up. Instead, the systems and methods disclosed herein may purge the turbine and associated components at turbine shutdown, then use pressure plugs and valves to maintain the purged state until turbine startup. By eliminating purging during startup, the turbine start time may be reduced, thus improving efficiency and reducing cost.

The techniques described herein provide for at least three main embodiments. In a first embodiment, liquid fuel is removed from being close to the combustor to being further away from the combustor. While having liquid fuel close to the combustor may be beneficial, for example, for quick starting of the turbine, this first focus area enables the purging of liquid fuel away from fuel lines and fuel nozzles close to the combustor so that the liquid fuel is at least 5 feet or greater (e.g., 6, 7, 8, 9, 10, 15, 20 feet or more) away from the combustor when the turbine is running on gas fuel. In a second embodiment, the techniques described herein provide for the purging and/or draining of liquid fuel a distance significantly upstream of the combustor. In this second focus area, the liquid fuel may be, for example, removed from a chamber containing the turbine. For example, the liquid fuel may be removed so that the liquid fuel is at least 10, 15, 20, 30, 40, 50 or more feet away from the combustor, and/or away from the chamber or room enclosing the turbine. In this second focus area, exposure of the liquid fuel to heat generated by the turbine may be minimized or eliminated completely. Accordingly, the liquid fuel may not react with any hot turbine compartment temperatures that would convert the liquid fuel into coke that would otherwise obstruct fuel lines and/or nozzles. Additionally, the "purge credit" may be more easily achieved, and longer term gas operations of the turbine may be more easily provided for. In a third focus area, liquid fuel lines that have been drained or purged are pressurized by using, for example, air. Pressurizing the liquid fuel lines with air may minimize or eliminate combustor back flow, thus increasing the safety of turbine operations.

With the foregoing in mind, it may be beneficial to describe certain systems that may advantageously include the purge systems and methods described herein. Accordingly, an embodiment of a turbine system 10 incorporating embodiments of the purge systems and methods is described in FIG. 1. The turbine system 10 may, for example, be manufactured by General Electric Company of Schenectady, N.Y., under the designations 7FA, 6FA, LM2500, 9F, and other models. It is to be understood that the depicted embodiment is for functional illustration and specific models of the turbine system 10 may have more or less components (e.g., low pressure components, high pressure components) in different arrangements and locations.

As depicted, the turbine system 10 may include a combustor 12. The combustor 12 may receive fuel through one or more fuel nozzles 13 that has been mixed with air, for combustion in a chamber within combustor 12. In the illustrated example, a fuel system 15 including a fuel supply system 17 may be used to provide the fuel to the fuel nozzles 13. Further, a fuel purge system 19 may be used to provide for at least two fuel purge modes of operation, as described in more detail below with respect to FIGS. 2-4.

Figure 1:
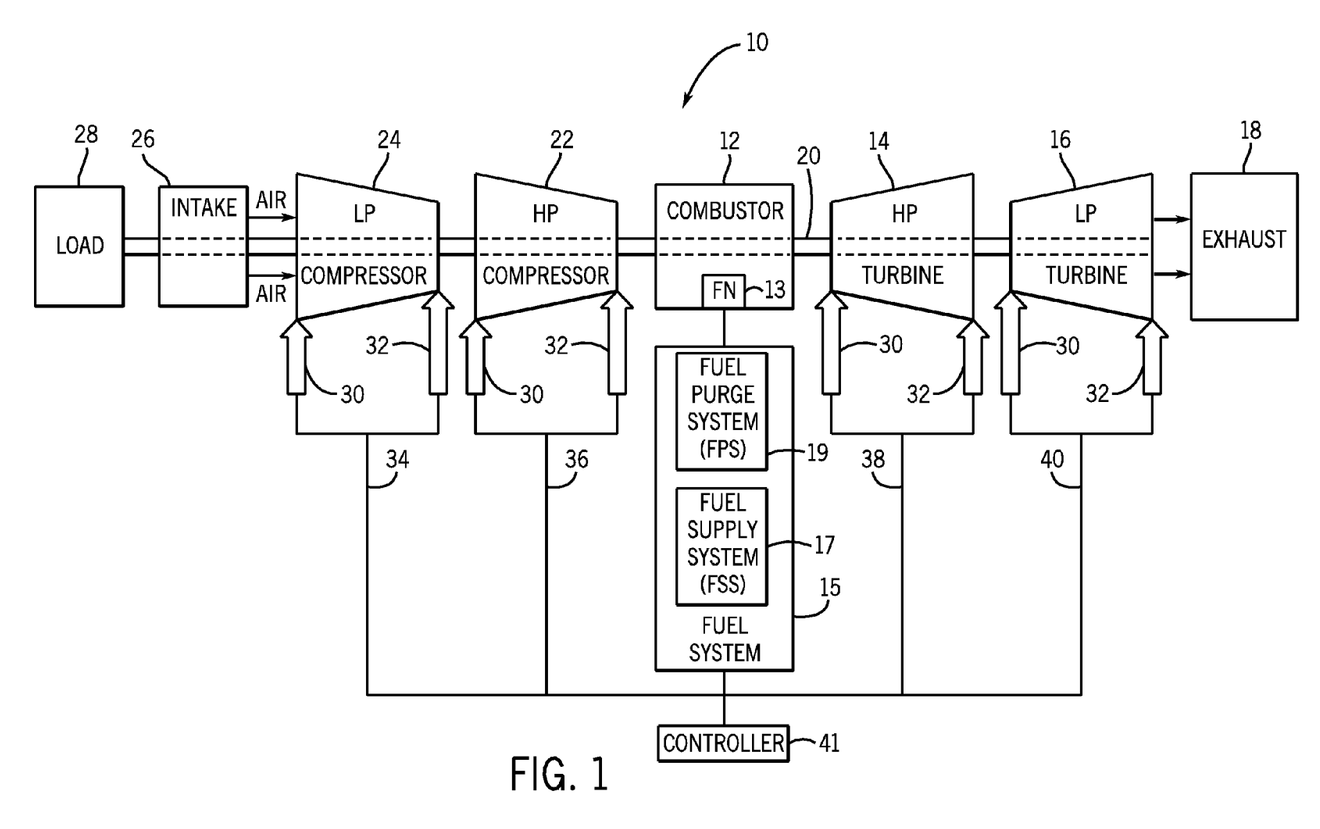
FIG. 1 is a diagram of an embodiment of a turbines system having a fuel purge system.

The combustion process creates hot pressurized exhaust gases. The combustor 12 directs the exhaust gases through a high pressure (HP) turbine 14 and a low pressure (LP) turbine 16 toward an exhaust outlet 18. The HP turbine 14 may be part of a HP rotor. Similarly, the LP turbine 16 may be part of a LP rotor. As the exhaust gases pass through the HP turbine 14 and the LP turbine 16, the gases force turbine blades to rotate a drive shaft 20 along an axis of the turbine system 10. As illustrated, drive shaft 20 is connected to various components of the turbine system 10, including a HP compressor 22 and a LP compressor 24.

The drive shaft 20 may include one or more shafts that may be, for example, concentrically aligned. The drive shaft 20 may include a shaft connecting the HP turbine 14 to the HP compressor 22 to form a HP rotor. The HP compressor 22 may include blades coupled to the drive shaft 20. Thus, rotation of turbine blades in the HP turbine 14 causes the shaft connecting the HP turbine 14 to the HP compressor 22 to rotate blades within the HP compressor 22. This compresses air in the HP compressor 22. Similarly, the drive shaft 20 includes a shaft connecting the LP turbine 16 to the LP compressor 24 to form a LP rotor. The LP compressor 24 includes blades coupled to the drive shaft 20. Thus, rotation of turbine blades in the LP turbine 16 causes the shaft connecting the LP turbine 16 to the LP compressor 24 to rotate blades within the LP compressor 24. The rotation of blades in the HP compressor 22 and the LP compressor 24 compresses air that is received via the air intake 26. The compressed air is fed to the combustor 12 and mixed with fuel to allow for higher efficiency combustion. Thus, the turbine system 10 may include a dual concentric shafting arrangement, wherein LP turbine 16 is drivingly connected to LP compressor 24 by a first shaft in the drive shaft 20, while the HP turbine 14 is similarly drivingly connected to the HP compressor 22 by a second shaft in the drive shaft 20 internal and concentric to the first shaft. Shaft 20 may also be connected to load 28, which may be a vehicle or a stationary load, such as an electrical generator in a power plant or a propeller on an aircraft. Load 28 may be any suitable device that is powered by the rotational output of turbine system 10.

The turbine system 10 may also include a plurality of sensors, configured to monitor a plurality of engine parameters related to the operation and performance of the turbine system 10. The sensors may include, for example, inlet sensors 30 and outlet sensors 32 positioned adjacent to, for example, the inlet and outlet portions of the HP turbine 14, the LP turbine 16, the HP compressor 22, and/or the LP compressor 24, respectively. The inlet sensors 30 and outlet sensors 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, vibration, clearance between rotating and stationary components, compressor discharge pressure, pollution, and turbine exhaust pressure. Further, the sensors 30 and 32 may also measure actuator information such as valve position, and a geometry position of variable geometry components (e.g., air inlet). The plurality of sensors 30 and 32 may also be configured to monitor engine parameters related to various operational phases of the turbine system 10. Measurements taken by the plurality of sensors 30 and 32 may be transmitted via module lines 34, 36, 38, and 40 into a controller 41. For example, module line 34 may be utilized to transmit measurements from the LP compressor 24, while module line 36 may be utilized to transmit measurements from the HP compressor 22. In a similar manner, module line 38 may be utilized to transmit measurements from the HP turbine 14, while module line 40 may be utilized to transmit measurements from the LP turbine 16. The controller 41 may additionally control the supply of fuel from the fuel supply system 17, as well as the purging of fuel by the fuel purge system 19.

Figure 2:
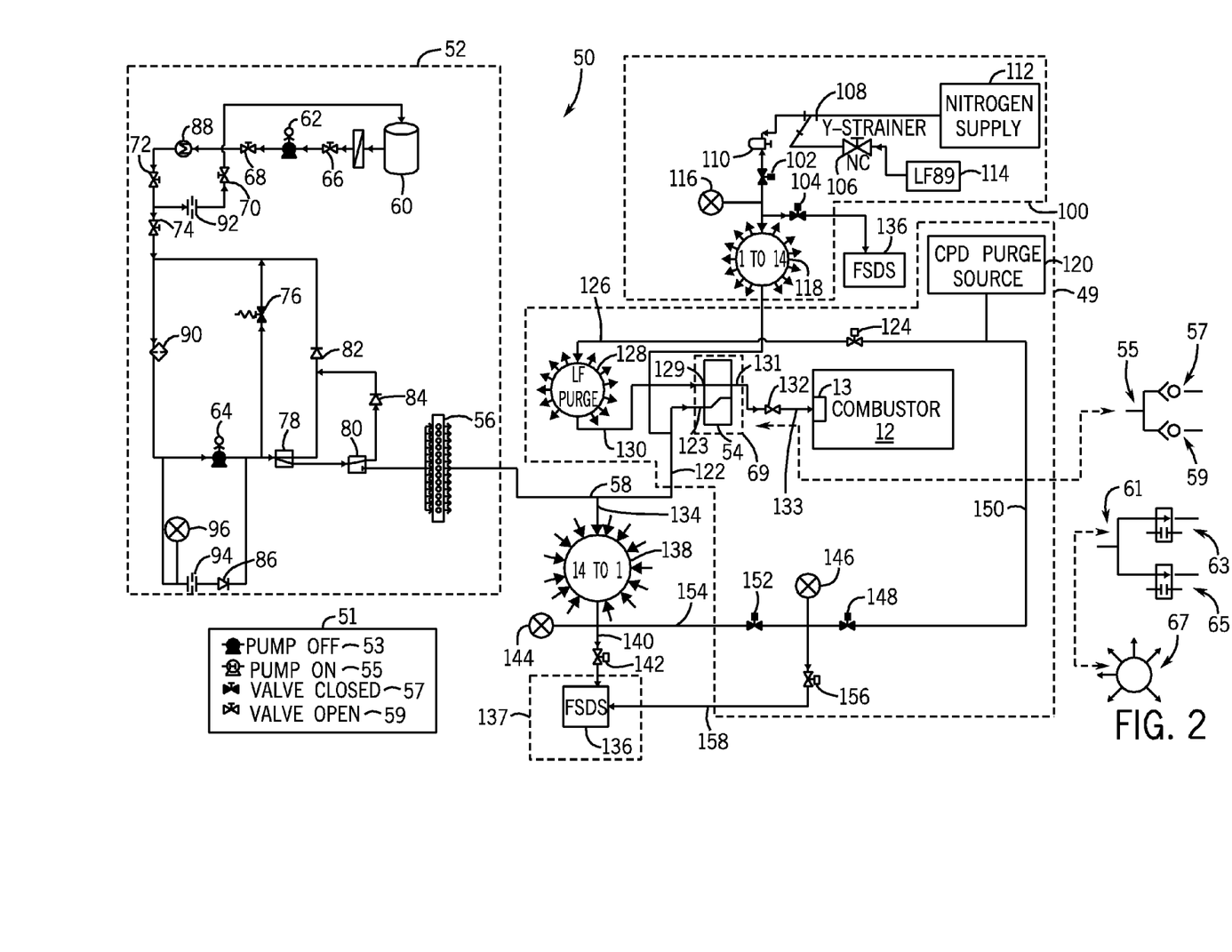
FIG. 2 is a diagram of an embodiment of a fuel purge circuit useful in purging fuel lines of the turbine system of FIG. 1.

FIG. 2 is a diagram of a fluid circuit 50 included in the fuel system 15 of FIG. 1, that may be used to supply and to purge fuel from the turbine system 10. A diagram legend 51 is also depicted, illustrating icons 53, 55, 57 and 59. The icon 53 denotes a pump when turned on, while the icon 55 denotes a pump when turned off. The icon 57 denotes a closed valve, while the icon 59 denotes a partially or fully open valve. It is noted that all equipment, including all valves depicted in FIGS. 2-4, may be controlled by the controller 41.

FIG. 2 also illustrates and embodiment of a liquid fuel sub-circuit 52 fluidly coupled to the combustor 12 through a three-way valve 54. In the depicted embodiment, the combustor 12 is enclosed inside a turbine compartment 49, and liquid fuel is delivered from the fuel sub-circuit 52 and into a 14-line manifold 56 having multiple downstream lines, such as a line 58, fluidly coupled the three-way valve 54. The turbine compartment 49 may include a width of between 5 ft. to 50 ft, a length of between 5 ft and 50 ft, and a height of between 5 ft and 50 ft. It is to be noted that, in other embodiments, more or less fluid lines may be used. For example, 1-13 fluid lines, or more than 14 fluid lines may be used. It is also to be noted that the schematic depicts connection details of the fluid line 58, other fluid lines may be connected in the same way as the depicted line 58.

The liquid fuel sub-circuit 52 may include a variety of components useful in storing and delivering fuel (e.g., diesel, syngas, and so on) to the combustor 12. In the depicted embodiment, the sub-circuit 52 includes a fuel tank 60, pumps 62, 64, valves 66, 68, 70, 72, 74, 76, flow control valves 78, 80, one-way valves 82, 84, 86 (e.g., check valves), heat exchanger 88, filter 90, tuning orifices 92, 94, and pressure sensor 96. It is to be understood that other embodiments may include more or less hydraulic and/or electronic components, including but not limited to sensors, controllers, pumps, valves, tuning orifices, flow restrictors, storage tanks, filters, flow dividers, and so on.

An inert fluid supply sub-circuit 100 is also depicted, useful in providing inert fluid, such as nitrogen, through fuel supply lines and nozzles 13, into the combustor 12. The sub-circuit 100 includes valves 102, 104, 106, a Y-strainer 108, a vessel 110, an inert fluid supply (e.g., nitrogen supply) 112, a fuel tank 114, a pressure sensor 116, and a manifold (e.g., nitrogen 14 port valve/manifold) 118. In the depicted embodiment, the manifold 118 is a 1 to 14 manifold that enables one conduit to distribute fluid to 14 conduits. In other embodiments, the manifold 118 may distribute fluid to more than 14 or less than 14 conduits. It is also to be noted that, in other embodiments, more or less hydraulic and/or electronic components may be provided, including but not limited to sensors, controllers, pumps, valves, tuning orifices, flow restrictors, storage tanks, filters, flow dividers, and so on. For example, item 118 and 138 may be a 14 port sliding valve (either normally open or closed) connected to each combustor. A drain may be headered into one line 140 for valve 138 and a single nitrogen feed line into valve 118, with multiple lines to valve 54 at each combustor.

The inert fluid (e.g., nitrogen) provided by the sub-circuit 100 may be used for purging and may also be injected into the combustor 12 to improve turbine system 10 performance. In some operating modes, the nitrogen may be mixed with fuel and/or air, and added for combustion. In other operating modes, the nitrogen may be used as an inert purge fluid useful in purging fuel from the turbine system 10. Indeed, nitrogen or a compressor discharge (CPD) fluid purge source 120 may each be used alone or in combination, to provide purge fluid suitable for purging fuel from the turbine system 10. Because of its inert properties, nitrogen purge may be particularly useful in applications where the turbine operates on syngas, and may be useful as a block and bleed fluid that blocks syngas from entering the combustor 12 while CPD purge fluid (e.g., air) is used to purge the combustor. The CPD fluid purge source 120 may provide a fluid, such as air, at different temperatures. In one embodiment, the CPD fluid purge source 120 and/or nitrogen provided by the sub-circuit 100 may be compressed and used as a backstop fluid. For example, air may be compressed and provided to fuel lines leading to the combustor 12, thus eliminating combustor backflow. Further, as described in more detail below, circuit, such as circuit 50, may be constructed suitable for purging and/or draining the liquid fuel a distance away from the combustor.

In the depicted embodiment, the three-way valve 54 (e.g., multi-way valve) combines the functionality of a fuel check valve and a fuel purge isolation valve (or purge check valve) into one valve component. Additionally, the three-way valve may be used to isolate liquids and/or gases, such as syngas, diesel and/or natural gas. In other embodiments, the valve 54 may be other multi-way valves (e.g., four-way valve, five-way valve, six-way valve). In yet other embodiments, as depicted, the three-way valve 54 may be replaced by a tee 55 having two check valves 57, 59, by a tee 61 having two 2-way valves 61, 63, by a multiport valve 67 having 6 to 18 lines or more, by a combination thereof, or with other components. As provided herein, the components 54, 55, 57, 59, 61, 63, 65, 67, and/or the combination thereof, are referred to as a fluid switching circuit 69. In the remainder figures, the fluid switching circuit 69 is depicted as having the three-way valve 54, but it is understood that the switching circuit 69 may include any of the components 54, 55, 57, 59, 61, 63, 65, and/or 67.

The depicted embodiment of FIG. 2 shows the use of the switching circuit 69 (e.g., three-way valve 54) during liquid fuel operations with full liquid fuel lines. In this first mode of purge operations, the liquid fuel lines 58 and 122 are kept full of liquid fuel following a turbine system shutdown. Backflow is eliminated due to the incompressible state of the liquid fuel. That is, backflow is eliminated because the liquid fuel acts as a blocking medium. In another mode of operations, a fluid, such as air provided by the CPD purge source 120, may be compressed and used as the blocking medium. The use of compressed air as the blocking medium may be particularly advantageous because it may remove fuel and minimize or eliminate coking of the fuel. In one example, a fluid line 133 may be purged and/or drained and then filled with the blocking medium (e.g., compressed air). Accordingly, fluid may be kept at a distance $d_1$ (e.g., length of line 133) away from the compressor 12. The distance $d_1$ may be, for example, greater than 1, 2, 3, 4, 5, 6, 7, 8, 9, 10, 11, 12, 13, 14 15 feet. Likewise, fluid may be drained from line 131 and valve 132 and compressed air inserted as the blocking medium. Accordingly, fluid may be kept at a distance $d_2$ (e.g., length of line 131 plus length of line 133 plus length of valve 132). The distance $d_2$ may be, for example, greater than 5, 6, 7, 8, 9, 10, 11, 12, 13, 14 15, 20, 25, 30, 35 feet. In yet another mode of operations, all fluid lines inside of the turbine compartment 49 containing the gas turbine may be drained and/or purged of fuel and subsequently filled with the blocking medium (e.g., compressed air). For example, all depicted lines leading to components 12, 54, 124, 128, 136, 138, 144, 146, 148, 152, and 156 may be drained and/or purged and filled with compressed air. Indeed, when drained and/or purged, only fuel lines inside of circuits 52, 100, and 137 may include fuel while the remaining lines may be filled with compressed air. Accordingly, fuel may be kept at a distance $d_3$ (e.g., length or width of the turbine chamber 49) away from the combustor 12, where $d_3$ may be greater than 15, 20, 21, 22, 23, 24, 25, 30, 35, 40 feet or more.

In the depicted embodiment, the three-way valve 54 may be actuated such that the manifold fuel line 58 and fuel line 122 are blocked. That is, the valve 54 is actuated to block fluid entering inlet 123. The actuation of the three-way valve 54, however, enables fluid flow of a fluid (e.g., air) from the CPD fluid purge source 120 through a valve 124 and purge line 126, into a manifold 128 (e.g., fuel purge manifold). That is, while inlet 123 is blocked, inlet 129 is opened, thus enabling fluid to flow through inlet line 129 and into an outlet line 131. In the depicted embodiment, the manifold 128 is a 1 to 14 manifold that enables one conduit to distribute fluid to 14 conduits. In other embodiments, the manifold may distribute to more than 14 or less than 14 conduits. The fluid may then be directed through a conduit 130, a distribution valve 132, line 133 and subsequently into the combustor 12. Accordingly, the CPD fluid purge source 120 may be used to provide purge fluid flowing through valves 124, 54, and 132 and into the combustor 12 while conduit lines 54 and 122 may be kept full of fuel.

Additionally, a conduit 134 may be used to direct fuel into a false start drain system (FSDS) 136. In the depicted embodiment, the conduit 134 directs fuel through a manifold 138, a conduit 140, and a valve 142 into the FSDS 136. The manifold 138 in the depicted embodiment is a 14 to 1 manifold suitable for directing fluid from 14 conduits into 1 conduit (e.g., conduit 140). In other embodiments, more than 14 or less than 14 conduits may direct fluid into 1 conduit. Pressure sensors 144 and 146 may be used for measuring fluid pressure entering the FSDS 136. A valve 148 is depicted as closed, thus blocking fluid flow from the CPD fluid purge source 120 through a conduit 150 and into the FSDS 136. Valve 152 is also depicted as closed, blocking fluid flow from the CPD fluid purge source 120 through a conduit 154. However, valve 156 is depicted as open, thus enabling additional pressure sensor 146 measurements, such as measurements through conduit 158.

The FSDS 136 may be used to remove residual fuel left over during a false start of the turbine system 10. Removing the residual fuel into the FSDS 136, for example through conduit 134, enables a known quantity of fuel to be made available during subsequent turbine system 10 start operations. By using the circuit 50, the turbine system 10 may be purged of fuel while maintaining substantially full liquid fuel lines upstream of the three-way valve 54. For example, full liquid fuel may be maintained from the three-way valve 54 up to and including the manifold 56. Additionally, during a second mode of purge operations, the circuit 50 may be used to purge the turbine system 10 while substantially draining fuel lines upstream of the combustor 12, as described in more detail below with respect to FIG. 3.

Figure 3:
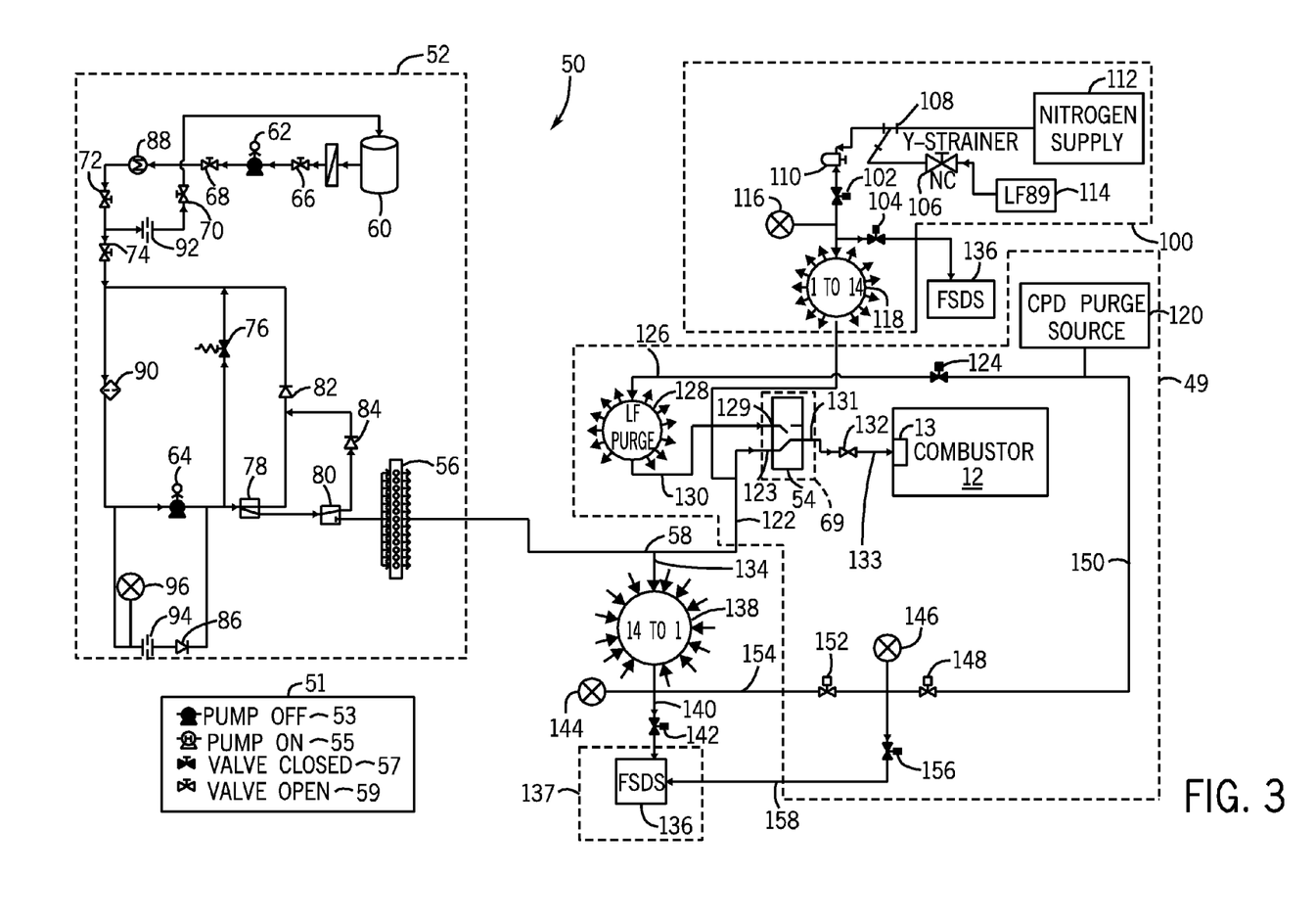
FIG. 3 is a diagram of an embodiment of the fuel purge system of FIG. 1, illustrating a purge circuit useful in purging the turbine system while maintaining full fuel lines.

FIG. 3 depicts an embodiment of the circuit 50 of FIG. 2 in which certain fuel conduits delivering fuel to the combustor 12, such as conduits 122 and 134, may be substantially drained of fuel. Indeed, the distance upstream or downstream from the combustor 12 having substantially no fuel may be approximately between 0 to 4 meters, 1 to 10 meters, 5 to 30 meters. Because FIG. 3 includes like elements to those depicted in FIG. 2, the like elements are depicted using like numbers.

In the illustrated embodiment, the three-way valve 54 is actuated to open (or partially open) the line 122 and to close the line 130. Additionally, the valves 124, 142, and 156 are actuated to close, and the valves 138, 148 and 152 actuated to open (or to partially open). The CPD fluid purge source 120 may then be directed to provide purge fluid, such as air, through the conduit 150, the valves 148 and 152, and the conduit 154. The purge fluid may then traverse the manifold 138 and enter the conduits 134 and 122, purging the conduits 134 and 122. The purge fluid may traverse the three-way valve 54 (e.g., through inlet 123 and out through outlet 131), continue through the valve 132, and into the combustor 12. The purge fluid may drive liquid fuel from conduits and valves that the purge fluid is traversing, thus substantially draining liquid fuel at a distance from the combustor 12. In this manner, liquid fuel may be removed at certain distances (e.g., between approximately between 0 to 4 meters, 1 to 10 meters, 5 to 30 meters from the combustor 12, or kept outside of the compartment 49). Indeed, the liquid fuel may be substantially removed from conduits and other components inside the turbine compartment or enclosure 49 housing the combustor 12. Additionally, a "purge credit" may be accrued, useful in reducing the start time of the turbine system 10 by eliminating the purging of the turbine system 10 and associated components (e.g., heat recovery steam generator [HRSG]) during start up operations, as described in more detail with respect to FIG. 4 below.

Figure 4:
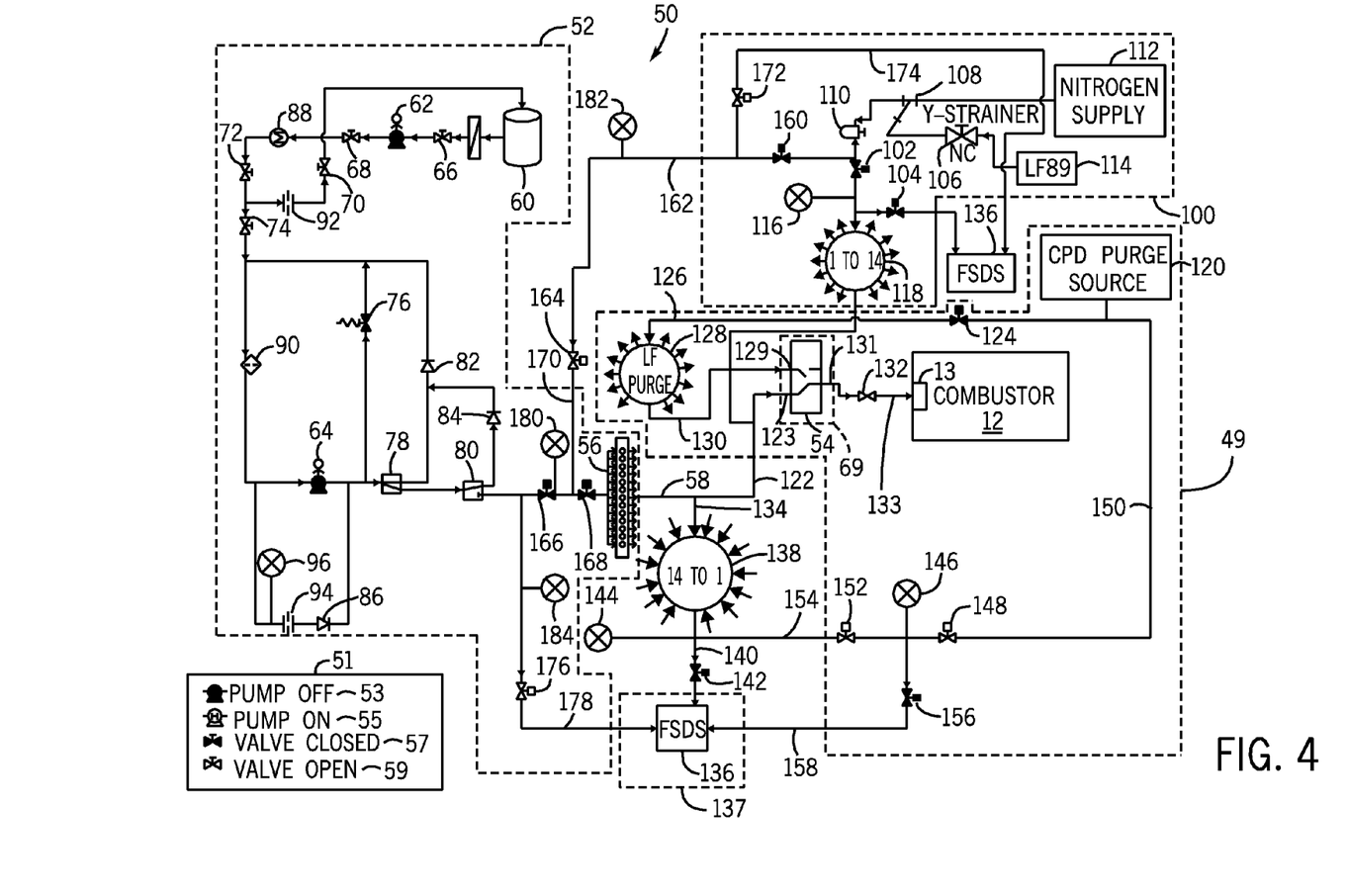
FIG. 4 is a diagram of an embodiment of the fuel purge system of FIG. 1, illustrating a purge circuit useful in procuring a purge credit for the turbine system.

FIG. 4 depicts an embodiment of the circuit 50 of FIGS. 2 and 3 with certain additional components, useful in providing "purge credit" to the turbine system 10. As mentioned above, the "purge credit" enables a faster turbine start by maintaining a purged turbine system. Accordingly, the turbine system 10 is already in a purged state during start up. Such a purged state may be maintained for a period of time, such as hours, days, weeks, and/or months. Indeed, by using the techniques providing for the purge credit, significant benefits may be enabled by eliminating or minimizing the time and electrical energy used to spin the compressor to purge the exhaust and/or HRSG prior to turbine start. Because FIG. 4 includes like elements to those depicted in FIGS. 2 and 3, the like elements are depicted using like numbers.

In the depicted embodiment, a valve 160 is fluidly coupled to the inert gas sub-circuit 100, with a conduit 162 leading to a valve 164. Two additional valves 166 and 168 are fluidly coupled to the manifold or flow divider 56, and placed upstream of the flow divider 56. A conduit 170 fluidly connects the valve 164 to the valves 166 and 168. A valve 172, a conduit 174, and a valve 176, and conduit 178, provide further fluid paths to the FSDS 136. Pressure sensors 180, 182, and 184, are also added. By providing for components 160, 162, 164, 166, 168, 170, 172, 174, 176, 178, 180, 182, and 184 to the circuit 50, "purge credit" may be obtained. For example, regulations such as the National Fire Protection Association (NFPA) document 85, boiler and combustion systems hazards code edition 2011, (and newer versions) may be adhered to by using the circuit 50 embodiment with the addition of components 160, 162, 164, 166, 168, 170, 172, 174, 176, 178, 180, 182, and 184.

In one example, the NFPA document 85 (NFPA 85), combustion turbine purge section 8.8.4.6 may be adhered to, including recommendations to enable a purge credit with liquid fuels in a pressurized conduit section. The components 160, 162, 164, 166, 168, 170, 172, 174, 176, 178, 180, 182, and 184 may thus provide for triple block and double drain valve arrangements filled with inert fluid (e.g., inert gas) or air and kept at a pressure that blocks liquid fuel from entering the combustion turbine (e.g., combustor 12) or duct burner such that certain conditions are met:

(1) The turbine system 10 first undergoes normal shutdown.

(2) Air or inert fluid is introduced to create and maintain a pressurized pipe section between middle (e.g., 166) and most downstream (e.g., 116, 168) block valves.

(3) Liquid fuel block and drain valve (e.g., 116, 164, 166, 168, 172, 176) positions are continuously monitored so that if continuous monitoring is lost or a valve deviates from its assigned position, the "purge credit" is lost and the subsequent start of the turbine system 10 uses a purge operation prior to light-off in accordance with NFPA 85, section 8.8.4.2.

(4) Pressure in the double block and drain pipe sections (e.g., 162, 170) are continuously monitored, and if the continuous monitoring is lost or the pressure downstream of the middle block valve decreases to less than approximately 3 PSID above the upstream pressure, purge credit is lost and the subsequent start of the turbine system 10 uses a purge operation prior to light-off in accordance with NFPA 85, section 8.8.4.2.

(5) The "purge credit" period (e.g., days, weeks, months) may be maintained when the conditions in (2)-(4) above are met.

(6) Provisions are provided to keep fuel from entering air or inert fluid supply lines at any time.

It is to be noted that while the circuit 50 and additional components 160, 162, 164, 166, 168, 170, 172, 174, 176, 178, 180, 182, and 184 shown in FIG. 4 may adhere to NFPA 85, combustion turbine purge credit section 8.8.4.6, more or less components (e.g., valves, conduits, sensors, actuators) may be used by other embodiments to comply with section 8.8.4.6., including embodiments that provide for conditions (1)-(6) described above. By enabling the purge of fuel at a distance from the combustor (e.g., approximately between 0 to 4 meters, 1 to 10 meters, 5 to 30 meters from the combustor, away from the compartment 49), an improved operation and enhanced safety for the turbine system 10 may be achieved. Additionally, a "purge credit" may be realized, thus reducing the start up time for the turbine system 10.

Technical effects of the invention include providing for at least two modes of fuel purging operations. In a first mode of purge operations, a turbine system may be purged while keeping approximately full fuel lines. In this first mode, the fuel may include liquid fuel, thus eliminating backflow due to the incompressibility of the liquid. In a second mode of purge operations, fuel lines may be substantially purged of fuel at a distance of approximately between 0 to 4 meters, 1 to 10 meters, 5 to 30 meters from the turbine combustor. In this second mode of operation, undesired backflow circumstances are eliminated because of the empty fuel lines. Additionally, a "purge credit" is enabled, suitable for attaining compliance with NFPA 85 (e.g., combustion turbine purge section 8.8.4.6). The "purge credit" may reduce the start up time of the turbine system by eliminating the use of a purge before start up. Instead, a previous purge may be credited and the turbine system may be fired without adding an additional purge operation. A three-way valve may be used to eliminate multiple valves and other components, and may be used to more efficiently switch between the first mode of purge operations and the second mode of purge operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine system comprising:
   a combustor configured to combust a fuel;
   a switching circuit fluidly coupled to the combustor and disposed upstream of the combustor;
   a fuel circuit comprising a fuel supply, wherein the fuel circuit is disposed upstream of the switching circuit and is configured to provide the fuel to the switching circuit;
   a fuel conduit section fluidly coupling the fuel circuit to the combustor;
   an inert fluid supply configured to provide an inert fluid to the switching circuit;
   a compressor discharge (CPD) fluid source configured to provide a purge fluid to the switching circuit, wherein the switching circuit is configured to purge the fuel from a first portion of the fuel conduit section by using the purge fluid, and wherein the first portion includes a length of between 5 ft and 50 ft; and
   a control system configured to control the switching circuit to maintain a purge condition by:
   (1) shutting down the turbine system via a normal shutdown;
   (2) introducing air or inert fluid to create and maintain a pressurized pipe section; and
   (3) continuously monitor a liquid fuel block and a drain valve position so that if continuous monitoring is lost or the liquid fuel block or the drain valve deviates from an assigned position, the purge credit is lost and the subsequent start of the turbine system use a purge operation prior to a light-off; and
   (4) continuously monitor a pressure in a double block and a drain pipe sections, and if the continuous monitoring is lost or a pressure downstream of a middle block valve decreases to less than approximately 3 PSID above an upstream pressure, purge credit is lost and the subsequent start of the turbine system use a purge operation prior to light-off.

2. The system of claim 1, wherein the switching circuit comprises a three-way valve, a tee having two check valves, a tee having two 2-way valves, a multiport valve having 6 to 18 lines, or a combination thereof.

3. The system of claim 2, wherein the purge of the first portion of the fuel conduit section complies with a purge credit as described in a National Fire Protection Association (NFPA) document 85 (NFPA 85), boiler and combustion systems hazards code edition 2011.

4. The system of claim 1, comprising a turbine compartment configured to enclose the turbine system having the combustor, and wherein the first portion of the fuel conduit section comprises a piping section diposed outside of the turbine compartment.

5. The system of claim 4, wherein the turbine compartment comprises a width of between 5 ft. to 50 ft, a length of between 5 ft and 50 ft, and a height of between 5 ft and 50 ft.

6. The system of claim 1, wherein the switching circuit is controlled by the controller to maintain a second portion of the fuel conduit section substantially full of the fuel while purging the fuel from the first portion of the fuel conduit section.

7. The system of claim 1, wherein the fuel comprises a diesel, a syngas, or a combination thereof.

8. The system of claim 1, wherein the inert fluid comprises a nitrogen.

9. The system of claim 1, wherein the purge fluid comprises a compressed air.

10. The system of claim 9, wherein the compressed air comprises a pressure of at least 14.7 PSI in order to eliminate backflow.

11. The system of claim 1, wherein the purge of the first portion of the fuel conduit section complies with a purge credit as described in a National Fire Protection Association (NFPA) document 85 (NFPA 85), boiler and combustion systems hazards code edition 2011.

12. A turbine system, comprising:
a turbine fluidly coupled to a combustor configured to combust a fuel;
a multi-way valve having a first inlet, a second inlet, and an outlet, wherein the outlet is fluidly coupled to the combustor;
a compressor discharge (CPD) fluid source configured to provide a CPD purge fluid to the multi-way valve through a first circuit fluidly coupled to the first inlet and through a second circuit fluidly coupled to the second inlet, wherein the multi-way valve is configured to switch between the first and the second inlets to purge the fuel from the turbine by using the CPD purge fluid; and
a control system configured to maintain a purge condition by:
(1) shutting down the turbine system via a normal shutdown;
(2) introducing air or inert fluid to create and maintain a pressurized pipe section; and
(3) continuously monitor a liquid fuel block and a drain valve position so that if continuous monitoring is lost or the liquid fuel block or the drain valve deviates from an assigned position, the purge credit is lost and the subsequent start of the turbine system use a purge operation prior to a light-off; and
(4) continuously monitor a pressure in a double block and a drain pipe sections, and if the continuous monitoring is lost or a pressure downstream of a middle block valve decreases to less than approximately 3 PSID above an upstream pressure, purge credit is lost and the subsequent start of the turbine system use a purge operation prior to light-off.

13. The system of claim 12, comprising the first circuit, wherein the first circuit is fluidly coupled to a fuel delivery circuit configured to provide the fuel from a fuel supply, and wherein the first circuit is configured to be maintained substantially full of the fuel during the purge.

14. The system of claim 13, comprising a second circuit having a liquid fuel purge manifold disposed between the multi-way valve and the CPD fluid source, and the multi-way valve is configured to direct the CPD purge fluid into the combustor through the second circuit to purge the fuel from the turbine.

15. The system of claim 12, wherein the first circuit is fluidly coupled to a fuel delivery circuit configured to provide the fuel from a fuel supply, and wherein the first circuit is configured to be maintained substantially empty of the fuel during the purge.

16. The system of claim 15, wherein the first circuit extends beyond a width, a length, and a height of a turbine compartment having the turbine.

17. The system of claim 15, comprising a 14 to 1 manifold disposed between the multi-way valve and the CPD fluid source, wherein the multi-way valve is configured to direct the CPD purge fluid into the 14 to 1 manifold to purge the fuel from the first circuit and from the turbine.

18. The system of claim 12, wherein at least one circuit fluidly coupled to or comprising the multi-way valve complies with a purge credit as described in a National Fire Protection Association (NFPA) document 85 (NFPA 85), boiler and combustion systems hazards code edition 2011.

19. A system comprising:
a three-way valve having a first inlet, a second inlet, and an outlet, wherein the outlet is configured to fluidly couple to a turbine system;
a fuel circuit fluidly coupled to the first inlet, wherein the fuel circuit is configured to provide a fuel to the turbine system;
a purge circuit fluidly coupled to the second inlet, wherein the purge circuit is configured to purge the turbine system of the fuel, and wherein the three-way valve is configured to switch between the first and the second inlets to purge the fuel from the turbine system; and
a control system configured to maintain a purge condition by:
(1) shutting down turbine system via a normal shutdown;
(2) introducing air or inert fluid to create and maintain a pressurized pipe section; and
(3) continuously monitor a liquid fuel block and a drain valve position so that if continuous monitoring is lost or the liquid fuel block or the drain valve deviates from an assigned position, the purge credit is lost and the subsequent start of the turbine system use a purge operation prior to a light-off; and
(4) continuously monitor a pressure in a double block and a drain pipe sections, and if the continuous monitoring is lost or a pressure downstream of a middle block valve decreases to less than approximately 3 PSID above an upstream pressure, purge credit is lost and the subsequent start of the turbine system use a purge operation prior to light-off.

20. The system of claim 19, wherein the three-way valve is configured to open the first inlet and close the second inlet to enable a flow of purge fluid through the fuel circuit, substantially removing the fuel from the fuel circuit and from the turbine system.

21. The system of claim 19, wherein the three-way valve is configured to open the second inlet and close the first inlet to enable a flow of purge fluid through the purge circuit, substantially removing the fuel from the turbine system while the fuel circuit is maintained substantially full of the fuel.

22. The system of 19, wherein the purge circuit complies with a purge credit as described in a National Fire Protection Association (NFPA) document 85 (NFPA 85), boiler and combustion systems hazards code edition 2011.

* * * * *